United States Patent [19]
Haze et al.

[11] Patent Number: 5,479,756
[45] Date of Patent: Jan. 2, 1996

[54] APPARATUS INTEGRATING SYSTEM

[75] Inventors: Setsuo Haze; Ryoji Nishimura; Masao Fukuda; Satoshi Konishi, all of Shiga, Japan

[73] Assignee: Ishida Co., Ltd., Japan

[21] Appl. No.: 253,528

[22] Filed: Jun. 3, 1994

[51] Int. Cl.$^6$ .......................... B65B 57/00; B65B 57/18; B65B 59/02; B65B 1/32

[52] U.S. Cl. .................................. 53/77; 53/52; 53/502; 340/825.07; 340/825.14

[58] Field of Search ................................. 53/77, 502, 52, 53/55; 340/825.07, 825.14, 825.17, 825.2

[56] References Cited

U.S. PATENT DOCUMENTS

| | | | |
|---|---|---|---|
| 4,441,302 | 4/1984 | Gabbitas et al. | 53/77 X |
| 4,607,252 | 8/1986 | Neri | 53/77 X |
| 4,757,451 | 7/1988 | Denda | 53/502 X |
| 4,780,830 | 10/1988 | Omi et al. | 53/502 X |
| 4,827,698 | 5/1989 | Banks | 53/502 X |
| 5,027,587 | 7/1991 | Ramsey | 53/77 X |

Primary Examiner—James F. Coan
Attorney, Agent, or Firm—Majestic, Parsons, Siebert & Hsue

[57] ABSTRACT

An apparatus integrating system such as a product shipping line includes a group of integrated apparatus each provided with a memory device for storing conditions of its operation, an input device through which conditions of operation for the group of apparatus can be set, a display device for displaying conditions and actual modes of operation of the apparatus group and control devices for controlling the apparatus group. Data are exchanged among the control devices of the apparatus through a communication device. Instead of providing a memory device to each apparatus, a master memory may be provided to only one or some of the apparatus or separately and away from the group of apparatus. The user can operate on the input device of any of the apparatus to set not only the conditions of operation of that apparatus but also the conditions of operation of the other apparatus through the communication device.

8 Claims, 10 Drawing Sheets

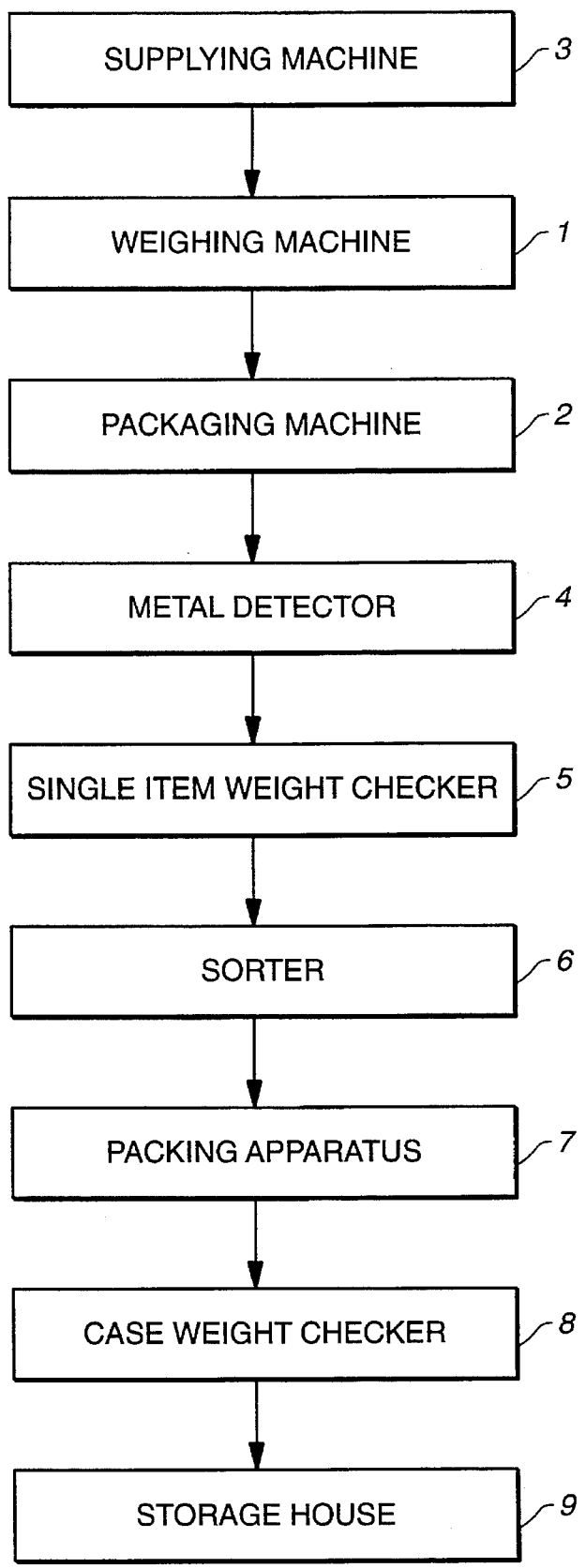
FIG._1

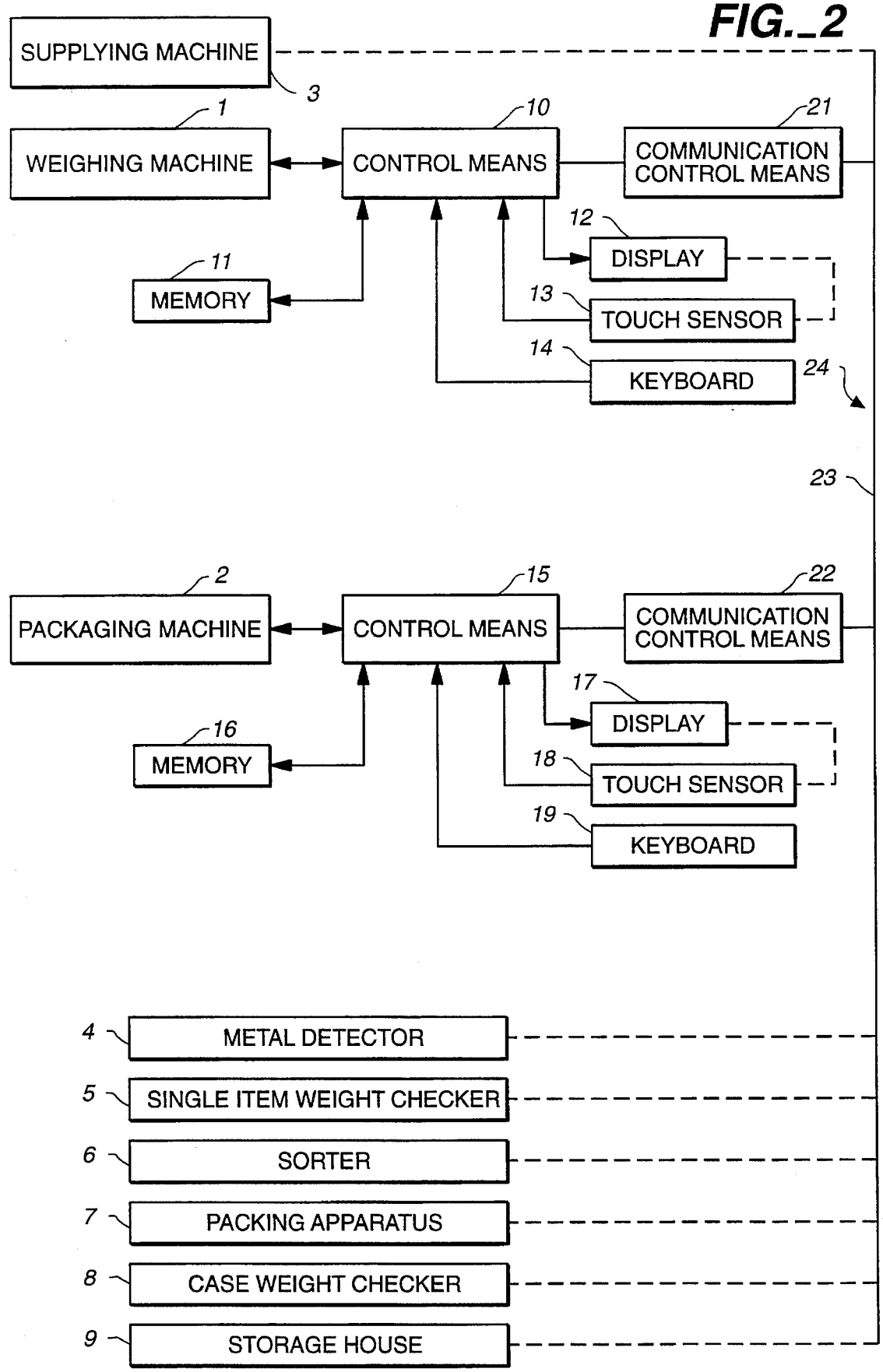
FIG._2

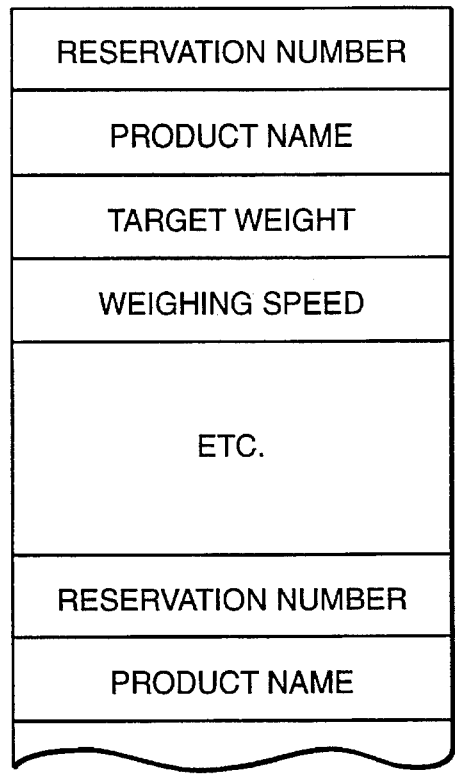
FIG._3
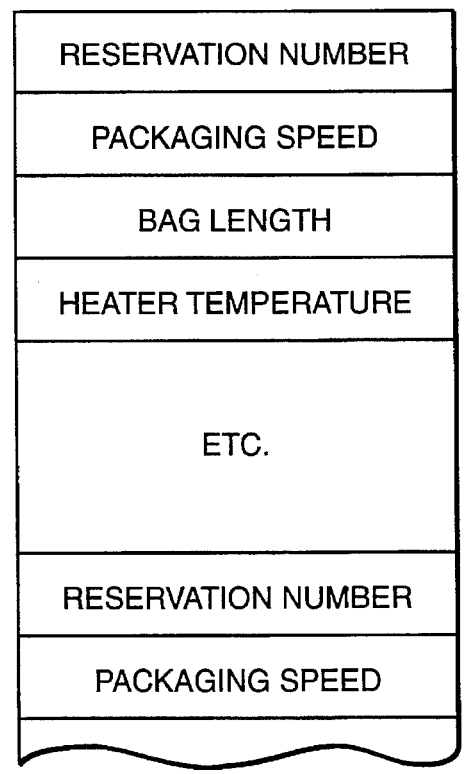
FIG._4

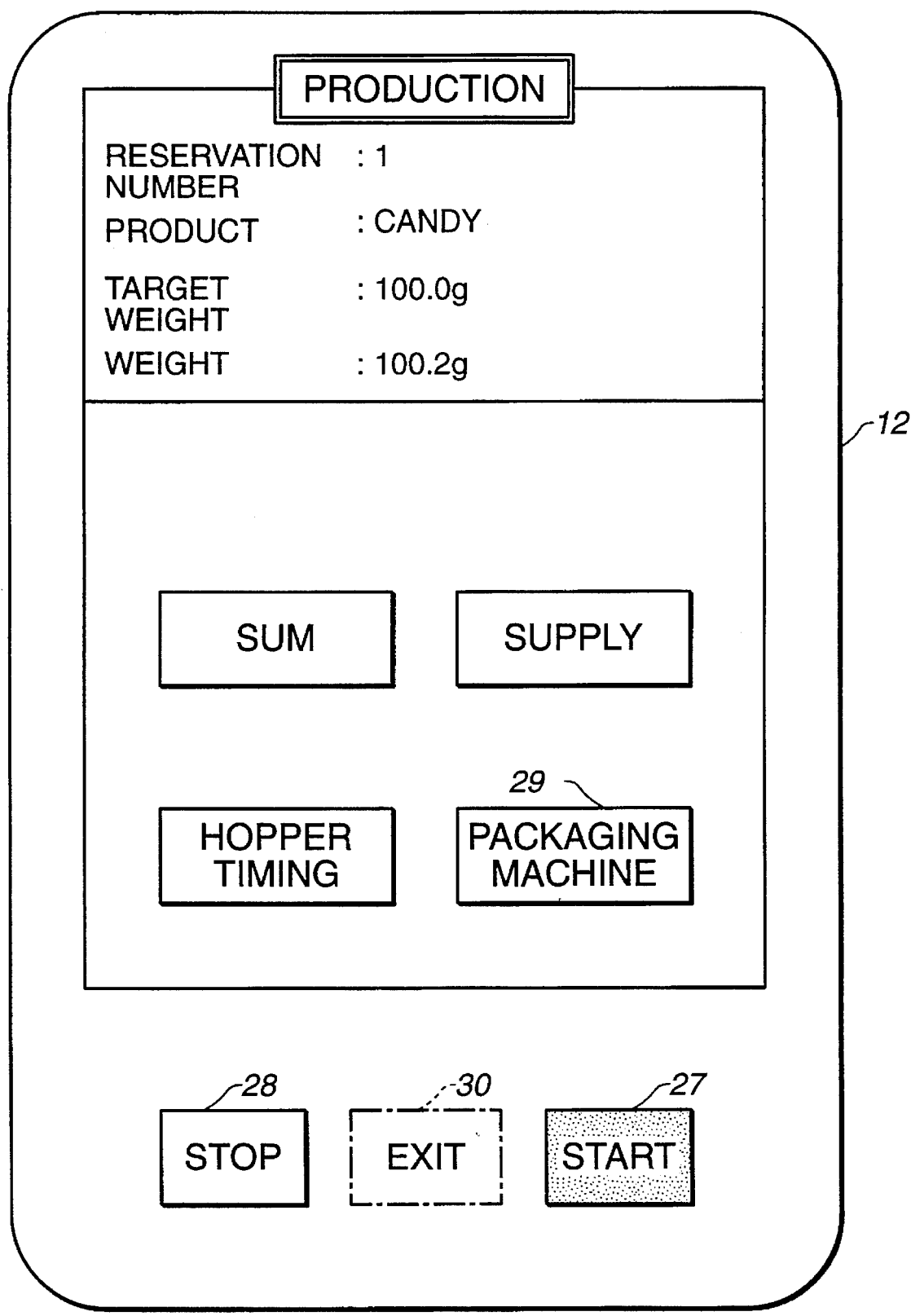
FIG._5

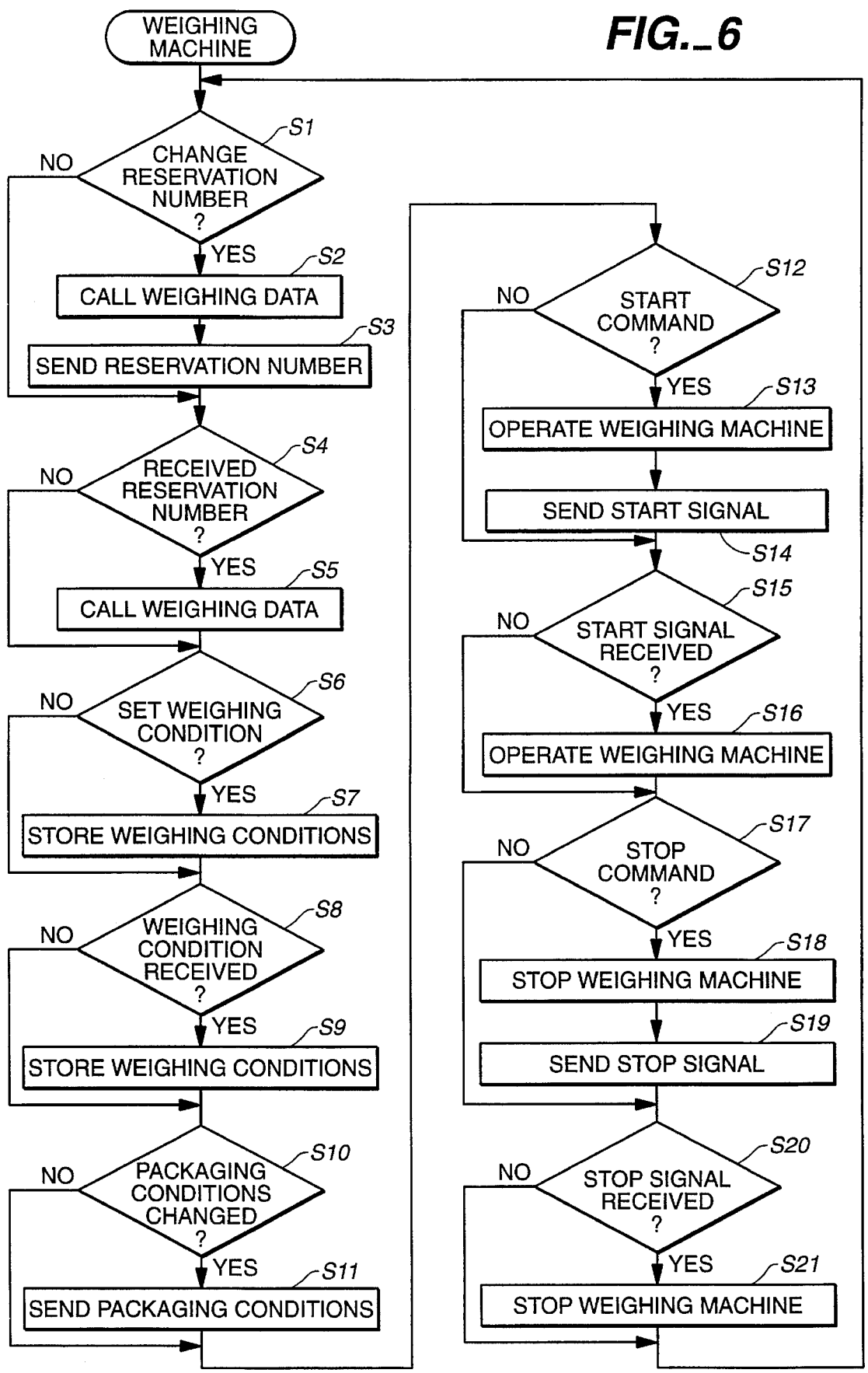
FIG._6

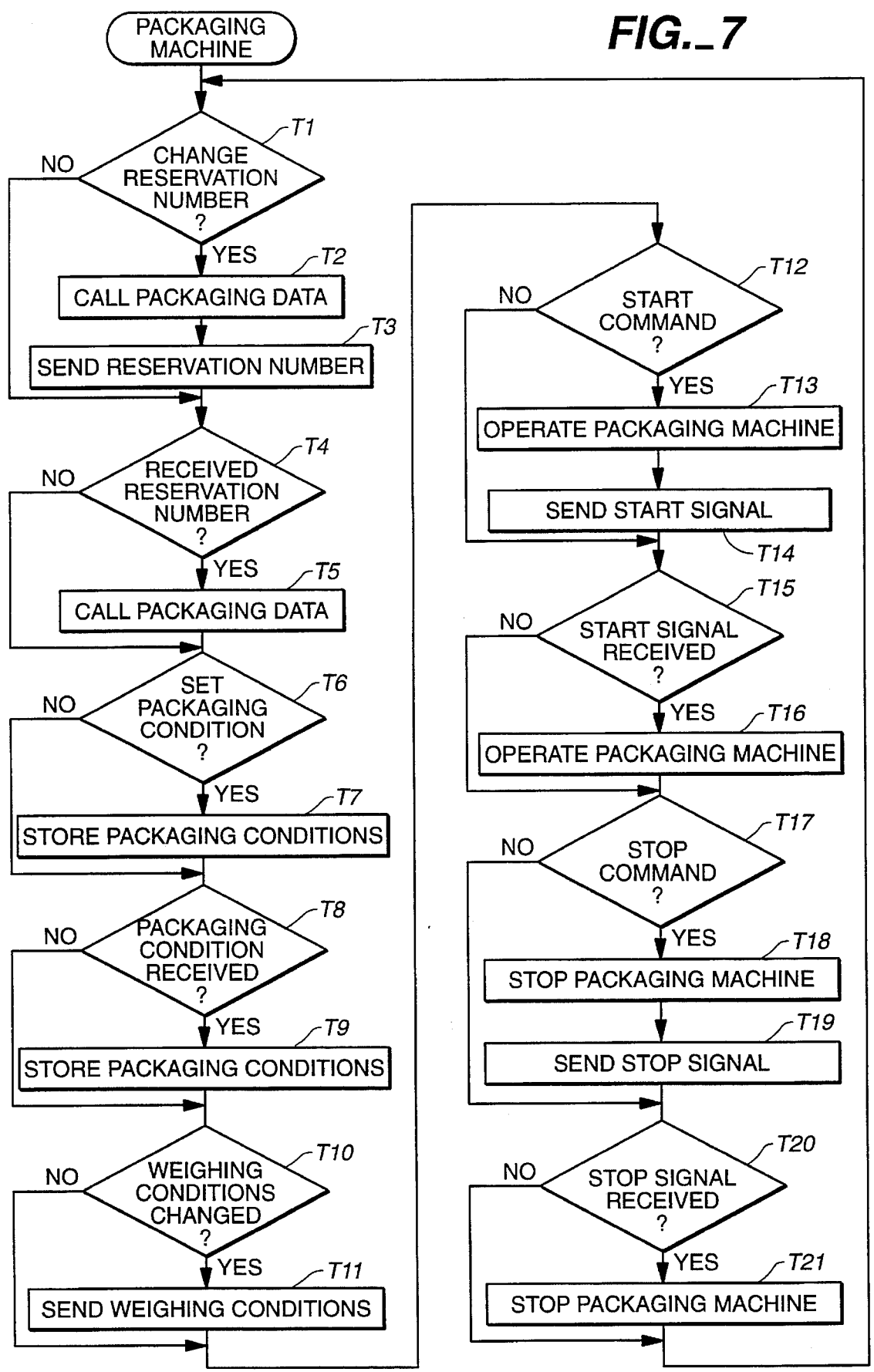
FIG._7

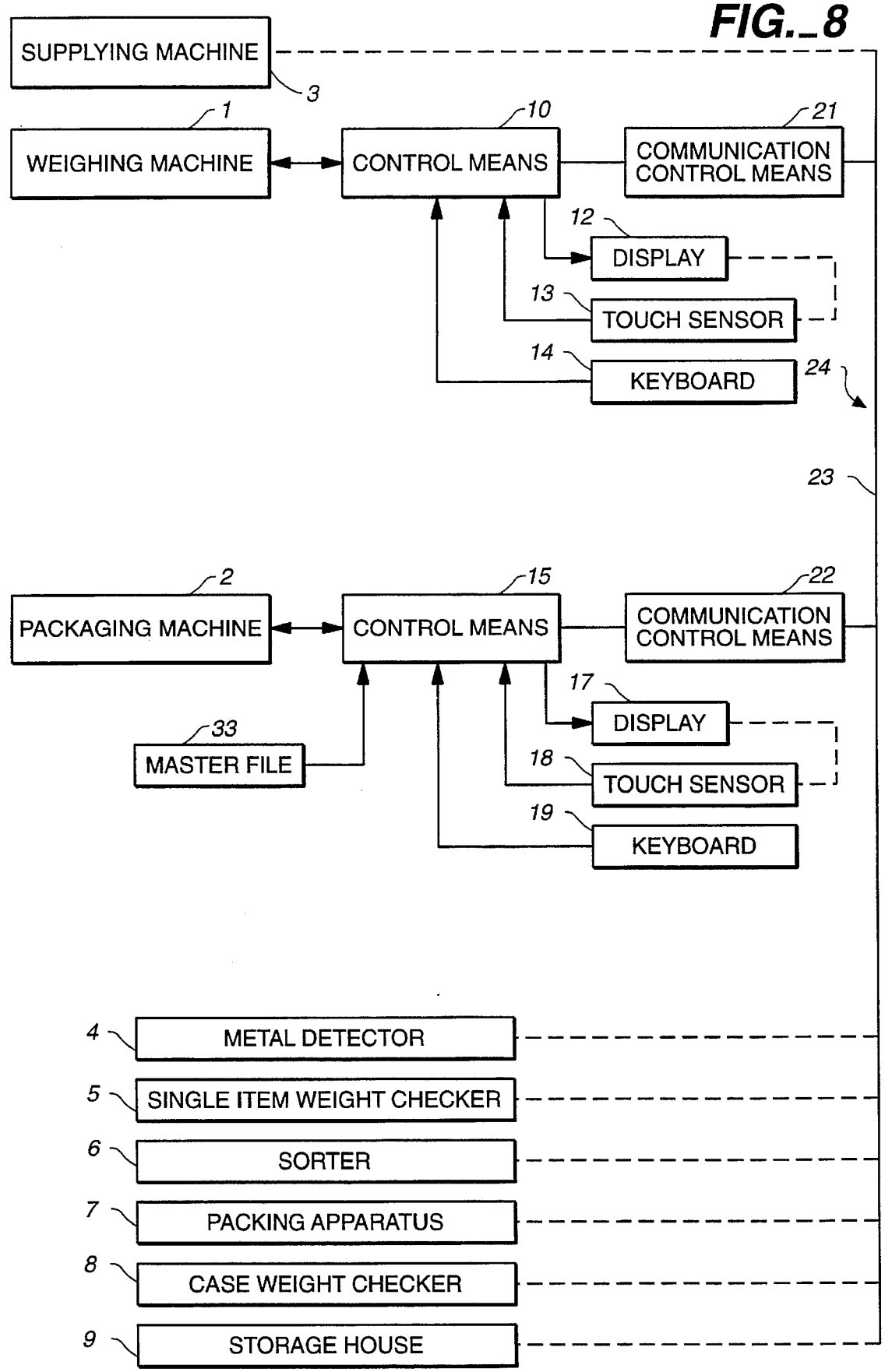
FIG._8

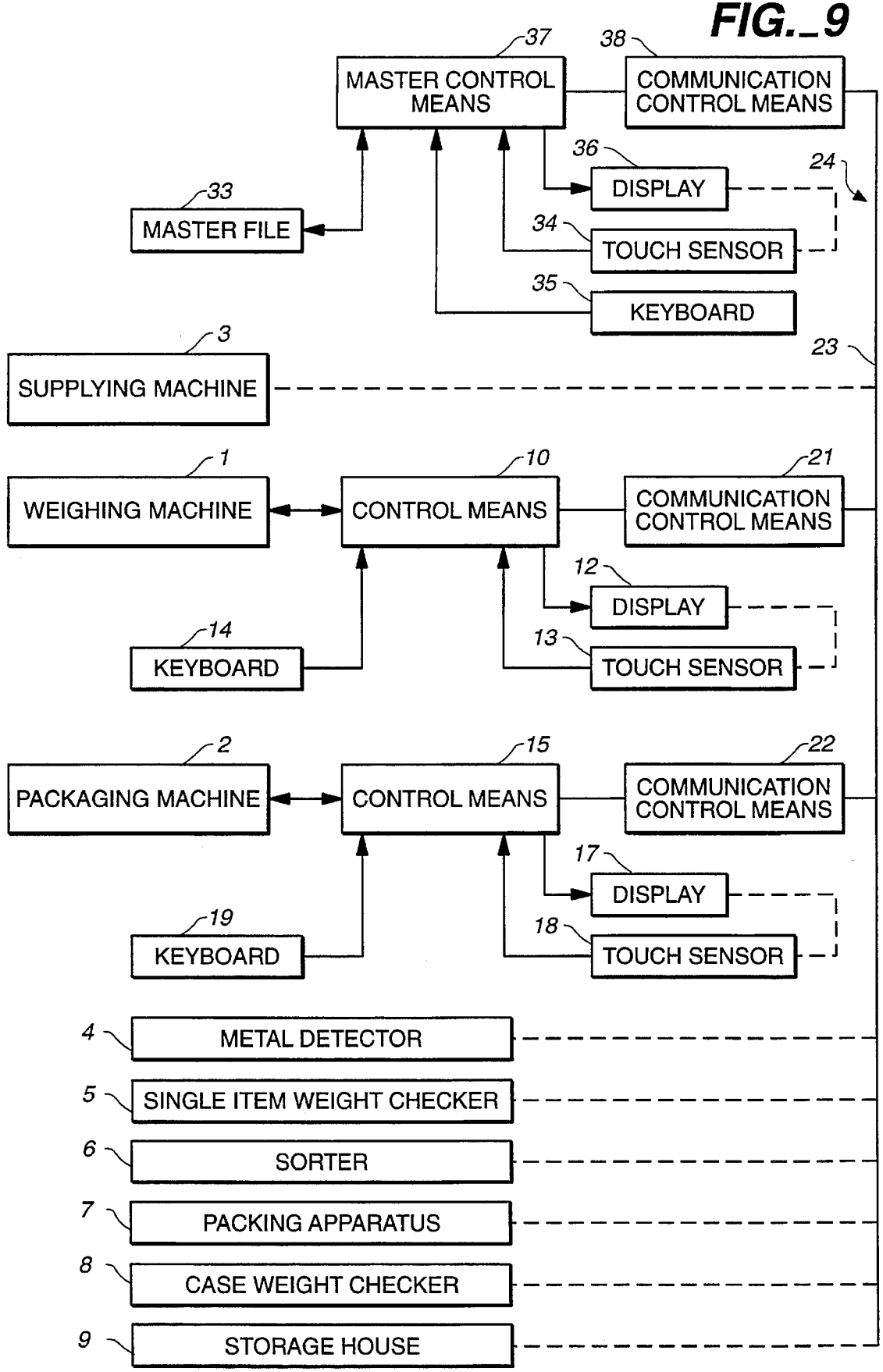
FIG._9

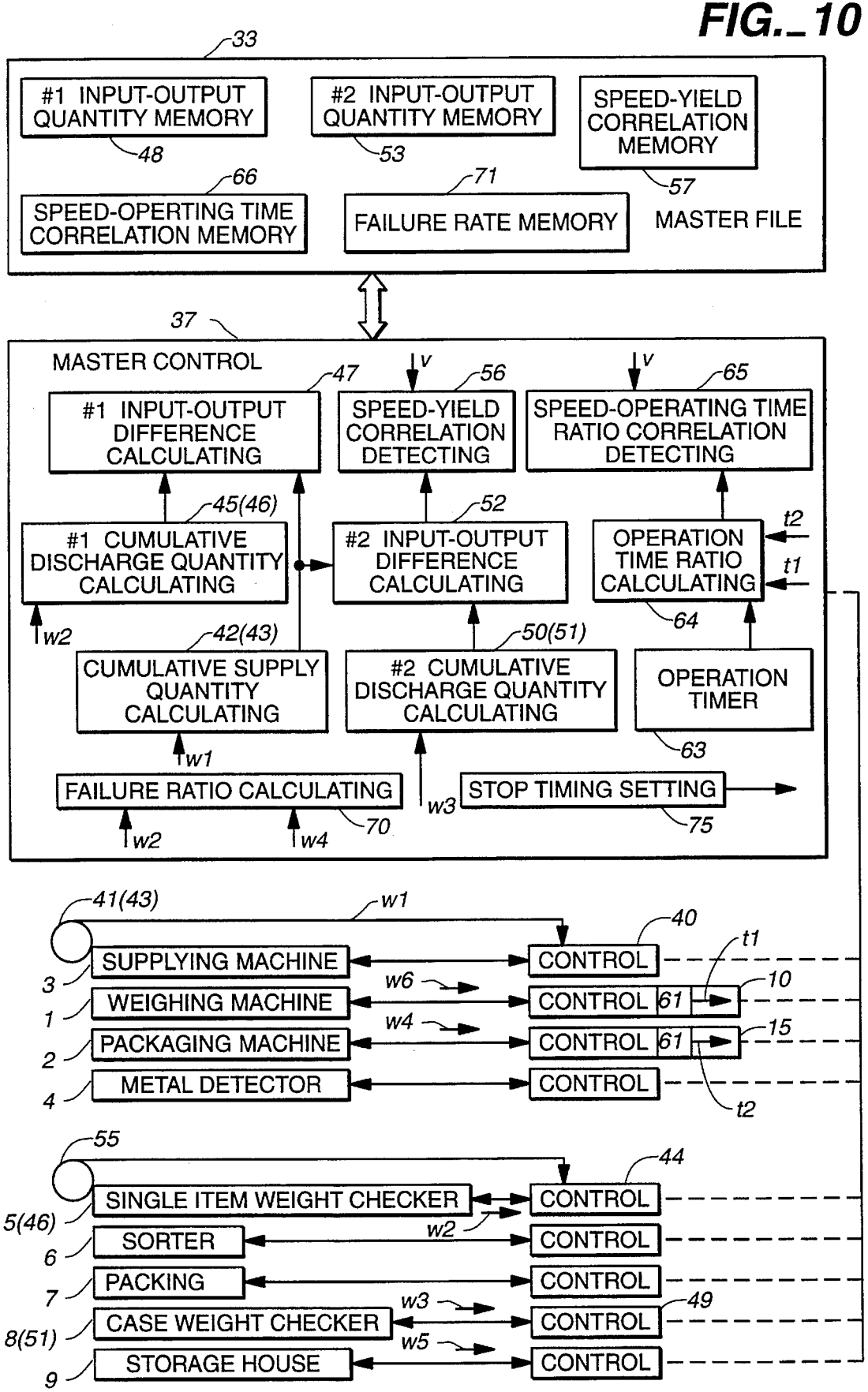
FIG._10

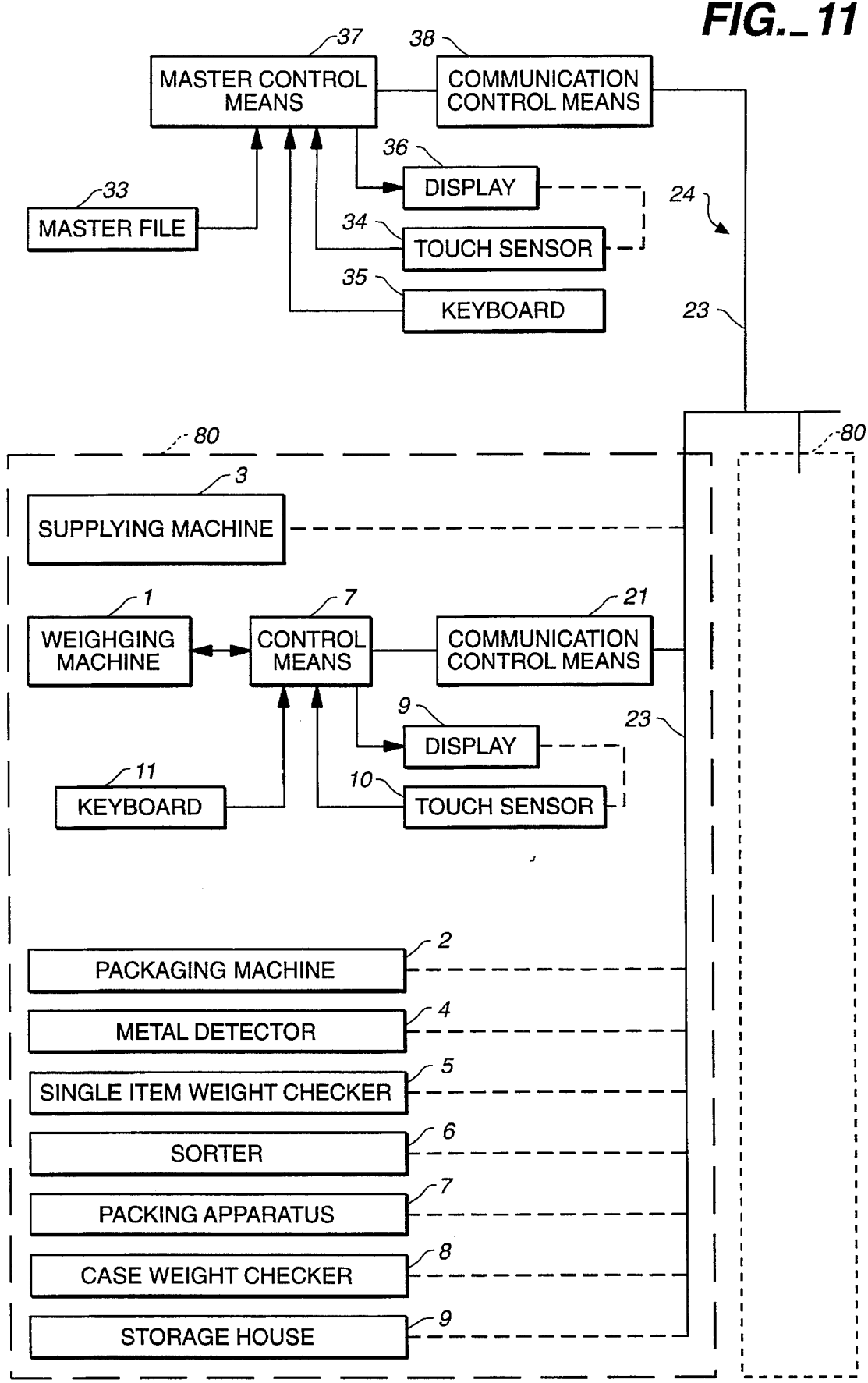
FIG._11

APPARATUS INTEGRATING SYSTEM

BACKGROUND OF THE INVENTION

This invention relates to an apparatus integrating system, and more particularly to a system of integrated apparatus, including a weighing machine for weighing products such as food items and industrial machine parts and a packaging machine for packaging such products, of which the operations are inter-related such that the operability of each apparatus of the system is improved.

Consider a food shipment line, as an example of such apparatus integrating system including a weighing machine and a packaging machine operating in coordination with each other. Such a system may include a supply conveyer for supplying materials or incomplete products, a weighing machine for weighing such materials or products which have been supplied to it, a packaging machine for packaging them after they are weighed, a weight checker for checking the weight of packaged products and removing defective ones if any abnormality is detected, a boxing apparatus for filling a box with a specified number of packaged products, and an automated storage house for sorting and storing boxed products, which are all operated in a mutually coordinated manner.

In a conventional system of this type, each apparatus or machine which comprises the system has its own control unit, making it necessary for the user to separately control the individual apparatus of the system. If these apparatus are set far apart, or if they are installed on different floors or levels of a building, for example, the user must travel a long distance to control the system.

In view of the above, Japanese Patent Publication Tokkai 62-103524 disclosed a technology of using a common control unit to control a weighing machine and a packaging machine which are intended to be operated in a mutually coordinated manner. Operation of a system becomes much simpler by such technology because two machines can be controlled from one control unit.

If the common control unit according to this technology is located somewhere far from the machines to be controlled thereby, however, the user will find it difficult to perform fine adjustments on them or to change their control conditions by running them while watching their conditions of operation. If the control unit is positioned close to only one of the machines to be controlled, making adjustments on the other machine is still troublesome for the same reason.

The present invention has been accomplished for solving such problems. In other words, a main object of the invention is to improve the operability of an apparatus integrating system including a weighing machine and a packaging machine such that the user can not only set operating conditions of individual apparatus from their individual control units but also the operating conditions of other apparatus of the system.

SUMMARY OF THE INVENTION

A system according to a first embodiment of the present invention, with which the above and other objects can be accomplished, is for carrying out shipment operations with a group of coordinately functioning machines and apparatus, inclusive of weighing and packaging machines, for weighing and packaging materials and incomplete products and thereafter putting them into boxes and storing them, if necessary. Each of the constituent machines and apparatus (called simply as "apparatus" hereinafter) is provided with a memory means for storing conditions of its operation, an input means for allowing a user to set conditions of operation of the group of apparatus, a display means for displaying the conditions and modes of operation of the group, and a control means for controlling the apparatus as well as the aforementioned memory and display means according to the inputs through the input means. The system also includes a communication means for exchanging data between the control means of the individual control means. In the above and throughout herein, the "conditions of operation" for an apparatus mean the conditions which are necessary for its control such as weight value and packaging speed, and the "modes of operation" mean the actual modes of operation, that is, the conditions of operation which are actually being used.

With a system thus structured, conditions of operation of any apparatus can be set through its own input means, and conditions of operation of other apparatus can also be set through the communication means. Accordingly, the user can be near any of the apparatus and observe its mode of operation while carrying out fine adjustments on different one of the apparatus. This serves to improve the operability of the system as a whole.

In a system according to a second embodiment of the invention, some of the apparatus are provided with a master memory means for storing conditions of operation of the entire group of apparatus. Each apparatus is provided with an input means for allowing the user to set conditions of operation of the group of apparatus, a display means for displaying the conditions and modes of operation of the group, and a control means for controlling the apparatus as well as the aforementioned master memory and display means according to the inputs through the input means. The system also includes a communication means for exchanging data between the control means of the individual control means as well as between the master memory means and the control means of the individual apparatus.

With a system thus structured, too, it is possible not only to set conditions of operation of any apparatus from the input means of that apparatus but also to set conditions of operation of different apparatus through the communication means. Accordingly, the user is again allowed to be near any of the apparatus and observe its mode of operation while carrying out fine adjustments on different apparatus. This also serves to improve the operability of the system as a whole.

When a condition of operation of the entire system is to be changed, such as when products of a different kind are going to be handled, this system makes it unnecessary for the user to specify the kind of product from the memory means of each apparatus. The user, in such a situation, has only to select through an input means the desired kind of products from a master memory means. In other words, a single operation suffices, and this additionally serves to improve the operability of the system.

Another advantage of this embodiment is that the total number of memory means can be reduced because master memory means for storing conditions and modes of operation of the entire group of apparatus are provided to only some of the apparatus and data can be retrieved from a master memory means from the input means of any apparatus through its control means. Moreover, data that are stored can be changed more easily because this can be done simply by updating the master memory means.

A system according to a third embodiment of the invention is characterized as comprising a master input means for setting conditions of overall operation related to the operation of the entire group of apparatus, (individual) input means provided to each apparatus for setting conditions of individual operations of that and related apparatus, a master memory means for storing the aforementioned conditions of overall and individual operations, a master display means for displaying the aforementioned conditions of overall operation and the modes of operations of the group of apparatus as a whole, (individual) display means provided to each apparatus for displaying at least the aforementioned conditions of individual operations and the modes of operations of the group, (individual) control means provided to each apparatus for controlling that apparatus as well as the display and master memory means according to the inputs from the master and other input means, a master control means for controlling the master memory means and the master display means according to inputs from the master input means as well as signals from the control means of the individual apparatus, and a communication means for exchanging data between the control means of the individual apparatus as well as between the master control means and the control means of the individual apparatus.

Since each apparatus is provided with an input means for setting conditions of individual operations related to that and other related apparatus (such as conditions of operating hoppers of a weighing machine, sealing temperature and pressure for a packaging machine), the user at the input means of any apparatus can set not only the conditions of operation of that apparatus but also those of other apparatus through the communication means. Thus, the user is again allowed to be near any of the apparatus and observe its mode of operation while carrying out fine adjustments on a different apparatus. This also serves to improve the operability of the system as a whole.

Because there is a master input means for setting conditions of overall operation of the entire group of apparatus and a master memory means for such conditions of overall operation and conditions of individual operations, any condition for overall operation, such as the kind of products to be handled, can be changed easily without the necessity of selecting a product name from the memory means of each apparatus. Since this can be accomplished merely by selecting an item from the master file through the master input means, a single operation will suffice, and this additionally contributes to the improvement of operability.

Since there are a master input means, a master memory means, a master display means and a master control means such that the user at the input mean of any of the group of apparatus can retrieve data from the master memory means through the control means of that apparatus and the master control means, the total number of memory means can be less than if each apparatus is provided with its own memory means. A system according to this embodiment is more convenient when stored data are to be changed because only the master memory means is required to be updated.

The aforementioned master input, master memory, master display and master control means may be positioned away from any of the group of apparatus. If they are placed at the management post for the system, the overall control of the system can be carried out even more conveniently.

The cost of constructing a system can be reduced if a large display device capable of displaying a large amount of data is used as the master display means while smaller low-capacity display devices are used as display means for the individual apparatus for setting conditions of operation of the group and displaying its modes of operation.

A system according to the third embodiment of the invention may preferably further comprise a supply detector means for detecting the cumulative sum of amount (weight or number) of materials or incomplete products supplied per unit time to a specified apparatus unit composed of one or more of the aforementioned group of apparatus, and a discharge detector means for detecting the cumulative sum of amount (weight or number) of completed products discharged per unit time from the same apparatus unit. Its master control means includes a difference-calculating means for detecting the yield by calculating the difference between the aforementioned cumulative sums of supplied and discharged amounts, and its master memory means includes means for storing the aforementioned cumulative sums and the difference therebetween.

If the entire group of apparatus of the system is considered as the apparatus unit in the above example, the yield of the group as a whole can be obtained from the difference between the total amount of materials and incomplete products supplied to the group and the total amount of completed products discharged from the group. The yield of any particular apparatus or a specified plurality of apparatus can also be obtained similarly by calculating the difference between the supplied amount and the discharge amount related to the specified apparatus.

If the system is further provided with a processing speed detector for detecting the processing speed at which products are processed by the system, if the master control means is provided with a speed-yield correlation detecting means for correlating the processing speed with the yield, and if the master memory means is provided with a speed-yield correlation memory means for storing both the processing speed and the yield together as mutually correlating data, not only can the user easily obtain the correlation between the line speed (or the processing speed) and the yield but the history of such speed-yield correlation can also be recorded. Such a record of correlation allows the user to discover an optimum line speed from the point of view of the yield.

Another preferred example of a system according to the third embodiment of the invention includes not only a processing speed detector as described above but also a timing means for measuring the time of operation, or non-operation, of any of the apparatus of the group. Its master control means is further provided with an operation-rate calculating means for calculating the operation time rate of an apparatus from a specified time period of operation of the group and the aforementioned time of operation or non-operation within the specified time period, and a speed-rate correlation detecting means for correlating the aforementioned processing speed (or line speed) with the aforementioned operation time rate, and its master memory means is further provided with a speed-rate correlation memory means for storing the aforementioned processing speed, the time of operation or non-operation and the operation time rate together as mutually correlating data. With a system thus structured, not only can the user easily obtain the correlation between the line speed and its correlation with the operation time rate, but the history of such speed-rate correlation can also be recorded. Such a record of correlation allows the user to discover an optimum line speed in order to improve the operation time rate.

Still another example of a system according to the third embodiment of the invention includes an upstream processing rate detecting means for detecting the quantity (weight or number) of products which is processed by those apparatus of the group on the upstream side (with respect of the direction of flow of the products) of any specified one of the apparatus of the group, and a downstream processing rate detecting means for detecting the similar quantity of products processed by those apparatus on the downstream side. Its master control means further includes a defect rate calculating means for calculating the difference between the aforementioned quantities as the defect rate of that specified apparatus, and its master memory means further includes a defect rate memory means for storing the aforementioned quantities from the upstream and downstream sides, as well as the difference therebetween. With a system thus structured, the user can easily obtain the defect rate of each apparatus such as the error by a calculating machine, and since the history of defect rate of each apparatus is recorded, the user can diagnose the apparatus of the group therefrom.

According to a further preferred example of a system according to the third embodiment of the invention, the master control means is further provided with a timing-setting means for sending to the control means of each individual apparatus the number of objects to be processed by that apparatus according to the number of products to be shipped and causing the operation of each apparatus to be stopped by its control means when the assigned number of objects to be processed has been reached. A system thus structured is capable of eliminating wastes because each of the apparatus is stopped automatically when the desired number of products to be shipped have been discharged at the outlet of the group of apparatus.

BRIEF DESCRIPTION OF THE DRAWINGS

FIG. 1 is a system diagram of a product shipment line which is an example of apparatus integrating system embodying the present invention;

FIG. 2 is a system diagram of a control system of a shipment line according to a first embodiment of the invention;

FIG. 3 is a drawing showing the contents of the memory means for the weighing machine in the shipment line of FIG. 2;

FIG. 4 is a drawing showing an example of contents of the memory means for the packaging machine in the shipment line of FIG. 1;

FIG. 5 is a front view of an example of display screen of the display means for the weighing machine;

FIG. 6 is a flow chart showing the operation of the control means for the weighing machine;

FIG. 7 is a flow chart showing the operation of the control means for the packaging machine;

FIG. 8 is a system diagram of a control system for a shipment line according to a second embodiment of the invention;

FIG. 9 is a system diagram of a control system for a shipment line according to a third embodiment of the invention;

FIG. 10 is a portion of the system diagram of FIG. 9 shown more in detail; and

FIG. 11 is a system diagram of a control system of a shipment line according to a fourth embodiment of the invention.

DETAILED DESCRIPTION OF THE INVENTION

In what follows, embodiments of the invention will be described with reference to the drawings.

FIG. 1 shows an apparatus integrating system represented by a shipment line for food articles such as candies. Apparatus which are integrated as a group in this system include an automatic weighing machine 1 for weighing objects such as materials and incomplete products and discharging a specified weight thereof, a packaging machine 2 for packaging weighed objects discharged from this weighing machine 1, a supplier 3 such as a conveyer for supplying objects supplied from outside to the weighing machine 1, a metal detector 4 for detecting metal objects which may have been mixed into packaged objects, a single item weight checker 5 for checking the weight of a packaged object, a sorter 6 for distinguishing between acceptable objects and unacceptable objects on the basis of a signal received from the weight checker 5, a packing apparatus 7 for placing a plurality of acceptable objects in each case, a case weight checker 8 for checking the weight of a case, and an automated storage house 9 for storing finished products packed in cases by sorting them. The apparatus 1–9 of this group are inter-connected so as to operate in a mutually coordinated manner such that objects supplied from outside can be weighed, packaged and shipped smoothly.

Although not illustrated, the automatic weighing machine 1 is of a well-known combinational weighing type, comprising a dispersion table with a center portion supported by a vibrator through suitable means so that objects to be weighed are vibrated and dispersed radially, a plurality of supply troughs radially disposed around it and supported by individual vibrators, a plurality of pool hoppers disposed in a circle for temporarily holding objects to be weighed which have been dropped from the individual supply troughs, and the same number of weigh hoppers as there are pool hoppers and disposed therebelow. The weighing machine 1 is also adapted to carry out combinational calculations on the basis of weight values determined by the weigh hoppers, select an optimum combination such that the sum of selected weight values will be equal to or the closest to a specified target weight value, and discharge the weighed objects from those of the weigh hoppers in the selected combination.

Although not illustrated, the packaging machine 2 is of the type comprising a folding mechanism for folding a film sheet pulled out of a film roll such that its both side edges will be superposed one on top of the other, a longitudinal heater for sealing together the superposed edges of the folded film sheet to thereby make it into a cylindrical form, a film-transporting mechanism for transporting the cylindrically formed film sheet longitudinally by a specified distance while holding it in a transverse direction, a cutting mechanism for cutting the cylindrically formed film sheet, and a transverse sealer for transversely sealing along the cut edges, such that weighed objects (or products) discharged from the weighing machine 1 are dropped into the cylindrically formed film sheet while it is being transported by means of the film-transporting mechanism.

The aforementioned supplier 3, metal detector 4, single item weight checker 5, sorter 6, packing apparatus 7, case weight checker 8 and storage house 9 are all well-known apparatus, and hence will not be described in detail.

Next, an operating system (or a computer system) for this group of apparatus 1–9 will be explained. As shown in FIG. 2, the weighing machine 1 is provided with a control means 10 for controlling its operations, a memory means 11 for storing conditions and modes of operations of the apparatus group 1–9, a display means 12 for displaying the conditions and modes of operations of the apparatus group 1–9, a touch sensor 13 (serving as an input means) for detecting a contact position on the display screen of the display means 12, and a keyboard 14 (also serving as an input means) through which conditions of operations of the apparatus group 1–9 can be set. The control means 10 is adapted not only to control the weighing machine 1 on the basis of operations on the touch sensor 13 and the keyboard 14 but also to read out or write in data from or into the memory means 11 and to cause data to be displayed on the display means 12.

Like the weighing machine 1, the packaging machine 2, too, is provided with a control means 15 for controlling its operations, a memory means 16 for storing the conditions and modes of operations of the apparatus group 1–9, a display means 17 for displaying the conditions and modes of operations of the apparatus group 1–9, a touch sensor 18 (serving as an input means) for detecting a contact position on the display screen of the display means 17, and a keyboard 19 (also serving as an input means) through which conditions of operations of the apparatus group 1–9 can be set.

Likewise, although not illustrated, the supplier 3, the metal detector 4, the single item weight checker 5, the sorter 6, the packing apparatus 7, the case weight checker 8 and the storage house 9 are each provided with its own control means, memory means, display means, touch sensor and keyboard.

The control means 10 of the weighing machine 1, the control means 15 of the packaging machine 2 and the control means of the other apparatus 3–9 are connected together through communication control means 21, 22, . . . which are each associated with the control means 10, 15, . . . of the individual apparatus 1–9 to control the transmission and reception of data, as well as communication line 23 connecting these communication control means 21, 22, . . . The communication control means 21, 22, . . . and the communication line 23 together form what is herein referred to as the communication means 24 for exchanging data among the control means 10, 15, . . .

In what follows, the weighing machine 1 and the packaging machine 2 will be used as representatives of the apparatus group 1–9 to explain the methods of their operation and control in detail.

As shown in FIG. 3, the memory means 11 of the weighing machine 1 serves to store product names, target weights, speeds of weighing operations and various other weighing data as conditions of operation for different reservation numbers each representing a key item. Similarly, as shown in FIG. 4, the memory means 16 of the packaging machine 2 serves to store speeds of packaging operations, bag lengths, heater temperatures and various other packaging data as conditions of operation for different reservation numbers each representing a key item. Operation mode data representing the current mode of operation are displayed on the display screen of the display means 12 of the weighing machine 1 as shown, for example, in FIG. 5. In addition, various command keys, such as START key 27 and STOP key 28, are visually displayed (as images). If the visually displayed START key 27 is touched, it is detected by the touch sensor 13 and inputted to the control means 10 of the weighing machine 1 and a start signal corresponding to the touching operation on the START key 27 is outputted to the weighing machine 1. If the STOP key 28 is touched, a stop signal corresponding to this touching operation is outputted to the weighing machine 1.

A PACKAGING MACHINE key 29 for operating the packaging machine 2 is visually displayed at a specified position on the display screen of the display means 12 of the weighing machine 1. If this PACKAGING MACHINE key 29 is touch-operated, signals are exchanged between the control means 10 and 15 of the weighing and packaging machines 1 and 2. Of the packaging data corresponding to reservation numbers stored in the memory means 16 for the packaging machine 2, predetermined data items of operation are called and caused to be displayed on the display screen of the display means 12. In this situation, the display screen displays modes of operation such as packaging speed, bag length, heater temperature and timing of packaging operations, that is, the current conditions of operation. Thus, the user can easily control the modes of operation of the packaging machine 2, even if it is situated farther away from the weighing machine 1, by touching command keys visually displayed on the display screen or physically operating numerical keys, for example, on the keyboard 11 to thereby change conditions of operation of the packaging machine 2 while observing the current modes of operation of the weighing machine 1.

If, for example, the user finds it necessary to reduce the weighing speed, while watching the modes of operation of the weighing machine 1, it is possible not only to so reduce the speed of weighing operations but also to reduce the packaging speed accordingly at the same time. When the operations on the packaging machine 2 are finished, the user will touch an EXIT key 30 also displayed on the display means 12 as shown in FIG. 5, thereby causing the original display to return on the display screen.

According to a preferred embodiment, a WEIGHING MACHINE key (not shown) for adjusting the weighing machine 1 is visually displayed at a specified position on the display screen of the display means 17 of the packaging machine 2. If this WEIGHING MACHINE key is touched, signals are exchanged between the control means 15 of the packaging machine and the control means 10 of the weighing machine 1 such that certain pre-determined operation items are called from among the weighing data corresponding to the reservation number stored in the memory means 11 of the weighing machine. These items are caused to be displayed on the display screen of the display means 17, and modes of operation such as weighing speed and target weight are displayed as operation items. Thus, a user, although situated near the packaging machine 2 but farther removed from the weighing machine 1, can operate on command keys visually displayed on the display screen or real numerical keys on the keyboard 19 to thereby control modes of operation of the weighing machine 1, while observing the conditions of operation of the packaging machine 2.

Next, the processes for operating the control means 10 and 15 for the weighing and packaging machines are explained with reference respectively to FIGS. 6 and 7.

As shown in FIG. 6, the control means 10 for the weighing machine first examines whether or not there has been a change in the reservation number by an input from the keyboard 14 (Step S1). If the answer is YES, data on weighing operations corresponding to the new reservation number are retrieved from the memory means 11 (Step S2), and the new reservation number is transmitted to the control means of the other apparatus 2–9, inclusive of the control means 15 for the packaging machine 2 (Step S3).

The control means 10 for the weighing machine 1 also examines whether or not a reservation number has been newly transmitted from any of the control means of the other apparatus 2–9 (Step 4). If one is found to have been newly transmitted, weighing data corresponding to the newly transmitted reservation number are retrieved.

Next, the control means 10 for the weighing machine 1 determines whether or not any weighing conditions have been set according to an input signal from the touch sensor 13 or the keyboard 14 (Step 6) and, if the answer is YES, these weighing conditions are recorded on a specified area of the memory means 11 (Step 7).

If the control means 10 for the weighing machine 1 further determines that weighing conditions have been newly received through any of the other apparatus (Step 8), such received weighing conditions are similarly stored on another specified area of the memory means 11 (Step 9).

Next, the control means 10 for the weighing machine 1 determines whether or not operating conditions of the other apparatus 2–9 have been changed according to an input from the touch sensor 13 or the keyboard 14 (Step 10). The answer is YES if, for example, a packaging condition has been changed and the changed packaging condition is transmitted to the control means 15 for the packaging machine 2 (Step S11).

After these steps are completed, the control means 10 for the weighing machine 1 determines whether a start-up command has been inputted through a signal from the touch sensor 13 (Step S12) and, if the answer is YES, the weighing machine 1 is activated and start-up signals are transmitted to the control means for the other apparatus 2–9 (Step S13).

At the same time, the control means 10 for the weighing machine 1 determines whether or not a start-up signal has been received from a different apparatus (Step S15) and, if the answer is YES, this start-up signal is used as a trigger and the weighing machine 1 is activated (Step S16).

Furthermore, the control means 10 for the weighing machine 1 determines whether or not a stop command has been received through a signal from the touch sensor 13 (Step S17) and, if the answer is YES, the weighing machine 1 is stopped (Step S18) and a stop signal is transmitted to the control means of the other apparatus 2–9 (Step S19).

The control means 10 for the weighing machine 1 also determines whether or not a stop signal has been received from any of the other apparatus (Step S20) and, if the answer is YES, this stop signal is used as a trigger and the weighing machine 1 is stopped (Step S21).

As shown in FIG. 7, the control means 15 for the packaging machine 2 first determines whether there has been a change in the reservation number on the basis of an input operation from the keyboard 19 (Step T1) and, if the answer is YES, data related to packaging corresponding to the new reservation number are retrieved from the memory means 16 (Step T2) and the new reservation number is transmitted to the control means for the other apparatus 1, 3–9 inclusive of the control means 10 for the weighing machine 1 (Step T3).

The control means 15 for the packaging machine 2 also determines whether or not a reservation number has been newly transmitted from the control means of any of the other apparatus 1, 3–9 (Step T4) and, if the answer is YES, packaging data corresponding to the newly received reservation number are retrieved (Step T5).

Next, the control means 15 for the packaging machine 2 determines whether or not packaging conditions have been newly set through input signals from the touch sensor 18 or the keyboard 19 (Step T6) and, if the answer is YES, these packaging conditions are recorded on a specified area of the memory means 16 (Step T7).

If the control means 15 for the packaging machine 2 determines that packaging conditions have been newly received from another apparatus (Step T8), such packaging conditions are similarly recorded on another specified area of the memory means 16 (Step T9).

Next, the control means 15 for the packaging machine 2 determines whether or not operating conditions of any of the other apparatus 1, 3–9 have been changed through input signals from the touch sensor 18 or the keyboard 19 (Step T10). If a weighing condition has been changed, for example, the answer is YES and the newly changed weighing condition is transmitted to the control means 10 for the weighing machine 1 (Step T11).

After these setting processes are completed, the control means 15 for the packaging machine 2 determines whether a start-up command has been inputted through a signal from the touch sensor 18 (Step T12) and, if the answer is YES, the packaging machine 2 is activated and start-up signals are transmitted to the control means for the other apparatus 1, 3–9 (Step T13).

At the same time, the control means 15 for the packaging machine 2 determines whether or not a start-up signal has been newly received from a different apparatus (Step T15) and, if the answer is YES, this start-up signal is used as a trigger and the packaging machine 2 is activated (Step T16).

Furthermore, the control means 15 for the packaging machine 2 determines whether or not a stop command has been received through a signal from the touch sensor 18 (Step T17) and, if the answer is YES, the packaging machine 2 is stopped (Step T18) and a stop signal is transmitted to the control means of the other apparatus 1, 3–9 (Step T19).

The control means 15 for the packaging machine 2 also determines whether or not a stop signal has been received from any of the other apparatus (Step T20) and, if the answer is YES, this stop signal is used as a trigger and the packaging machine 2 is stopped (Step T21).

In summary, a user at the position of any of the apparatus 1–9, such as the weighing machine 1, can not only set the operating conditions of the weighing machine 1 by operating on its input means 13 and 14 but also set the operating conditions of the other apparatus 2–9 through the communication means 24. In other words, it is possible for the user to be near any of the apparatus 1–9 and to observe its operating conditions while carrying out fine adjustments on another of the apparatus 1–9. This is how the operability of a shipping line can be improved according to the invention.

Next, a second embodiment of the invention is described.

Although each of the apparatus 1–9, according to the first embodiment of the invention illustrated in FIG. 2, is provided with its own memory means 11, 16, . . . , the second embodiment is different wherein a master file (or a master memory means) 33 is provided to some of the apparatus (such as the packaging machine 2) as shown in FIG. 8. The master file 33 serves to store work conditions for the apparatus 1–9 including system work conditions related to the entire group of apparatus such as quantity of production, yield data, product and code names of various products, weighed values, packaging speed and type of packaging material, and individual work conditions related to individual apparatus such as conditions on motions of hoppers of the weighing machine, timing of the mechanical motions of each apparatus, operating conditions of motors and heater temperature.

The control means provided to each of the apparatus 1–9 is adapted to control the associated apparatus, the master file 33 and the display means. The control means 10 provided to the weighing machine 1, for example, not only controls the weighing machine 1 according to signals received through the touch sensor 13 and the keyboard 14 but also reads and writes data from and into the master file 33 and displays data on the display means 12.

Communication means 24, including communication control means 21, 22, . . . and a communication line 23, serves to transmit data among the control means 10, 15, . . . of the individual apparatus 1–9 and also between the master file 33 and these control means 10, 15, . . .

Operations of a system according to the second embodiment of the invention are carried out in the same way as for the first embodiment described above except data are exchanged with the master file 33 instead of the individual memory means 11, 16, . . . in the case of the first embodiment. That is, the weighing machine 1 and the packaging machine 2 are operated in the same way as shown by the flow charts of FIGS. 5 and 6.

According to the second embodiment of the invention, too, the user can operate the input means of one of the apparatus 1–9 to set not only operating conditions of the associated apparatus but also those of the other apparatus through the communication means 24. Thus, operability of the apparatus group improves because the user can be near any of the apparatus to watch its operation conditions while carrying out fine adjustments of another of the apparatus group.

When a work condition affecting the entire system, such as the kind of products to be handled, is going to be changed, there is no need to specify the new kind of product from the memory means of any of the individual apparatus 1–9. Since the user has only to select the new kind of product from the master file 33 through any of the input means 13, 14, 18, 19, . . . , one operation by the user suffices and the change can be effected easily.

If the conditions of operating or the actual conditions of operation are stored in the master file 33, it becomes possible for the user to carry out performance management of the system. The overall management of the system as a whole becomes easier if the user can quickly grasp the rate at which defective products are being produced and identify which of the apparatus is defective.

More than one of the apparatus 1–9 may be provided with a master file 33. Consider a situation where a system is formed by combining an apparatus produced by a different maker having no master file with one of a plurality of apparatus (according to the present invention). If this plurality of apparatus is provided with a master file, one immediately sees the advantage that a system with a master file can thus be formed easily even if one of the apparatus is from a different maker.

FIG. 9 shows a third embodiment of the invention characterized as having a master file (master memory means) 33, a touch sensor (master input means) 34, a keyboard (master input means) 35, a display (master display means) 36, a master control means 37 and a communication control means 38 apart from the group of apparatus 1–9.

This master file 33, too, serves to store work conditions for the apparatus 1–9 including system work conditions related to the entire group of apparatus such as quantity of products to be produced, yield data, product and code names of various products, weighed values, packaging speed and type of packaging material, and individual work conditions related to individual apparatus such as conditions on motions of hoppers of the weighing machine, timing of the mechanical motions of each apparatus, operating conditions of motors and heater temperature.

The aforementioned system work conditions can be set from the touch sensor 34 or the keyboard 35. The display 36 is for displaying the system work conditions and the operating conditions of all apparatus 1–9 and comprises a high-level display device capable of displaying a large quantity of data related to the system. By contrast, the display means 12, 17, . . . associated with the individual apparatus 1–9 are intended to display only the individual work conditions and the operating conditions of the individual apparatus 1–9 and hence each comprise a lower-level display device with a relatively small capacity.

The individual input means each associated with one of the individual apparatus 1–9 are used for setting the individual work conditions related to the corresponding apparatus as well as the apparatus associated with it. From the input means 13, 14 of the weighing machine 1, for example, individual work conditions related to the operation of the weighing machine as well as those related to the packaging machine 2, the supplier 3 and the single item weight checker 5, which are connected thereto, can be set.

The control means associated with the individual apparatus are adapted to control the associated apparatus and its display means according to inputs received through the master input and individual input means. For example, the control means 10 associated with the weighing machine 1 not only controls the weighing machine 1 but also displays data on the display means 12, reads and writes data from and into the master file 33 according to inputs received through the master input means 34 and 35 as well as inputs received through the input means 13 and 14 associated with the weighing machine.

Communication means 24, including communication control means 21, 22, . . . and the communication line 23, serves to transmit data among the individual control means 10, 15, . . . of the individual apparatus 1–9 and also between the master control means 37 and these individual control means 10, 15, . . . Thus, data can be transmitted from the master control means 37 to the individual control means 10, 15, . . . through the communication means 34 by operating the master input means 34 or 35. Similarly, data can be transmitted from the individual control means 10, 15, . . . to the master control means 37 through the communication means 24 by operating any of the input means 13, 14, 18, 19, . . . of the individual apparatus 1–9.

Accordingly, system work conditions such as the quantity of products to be produced and the product name set by an operation on the master input means 34 or 35 are transmitted through the communication means 24 to the control means of the individual apparatus 1–9, and the individual apparatus 1–9 are controlled according to such system work conditions that have been set.

On the other hand, individual work conditions such as conditions on motions of hoppers of the weighing machine, timing of the mechanical motions of each apparatus, operating conditions of motors and heater temperature are displayed on the individual display means 12, 17, . . . by an operation on any of the individual input means 13, 14, 18, 19, . . . of the individual apparatus 1–9, If an individual work condition is changed by an operation on any of these individual input means 13, 14, 18, 19, . . . , the change is also effected in the master file 33.

The operations for setting the aforementioned individual work conditions are the same as described above for a system according to the first embodiment of the invention except the retrieval and storage of data are effected from and into the master file 33 (rather than the individual memory means 11, 16, . . . as shown in FIG. 2 for a system according to the first embodiment). Thus, the operations for the weighing machine 1 and the packaging machine 2 are also as shown by the flow charts of FIGS. 5 and 6.

Since the individual apparatus 1–9, according to the third embodiment of the invention, are provided with the input means 13, 14, 18, 19, . . . for setting individual work conditions for the operations not only of themselves but also of those associated therewith, the user at any one of the apparatus 1–9 is able to operate on its control means to set not only the operating conditions of the apparatus associated with it but also those of the other apparatus through the communication means 24. In other words, the operability of the apparatus 1–9 can be improved since the user near one of the apparatus 1–9 can keep watching its operating conditions while carrying out fine adjustments of the others.

When a change is to be made on a work condition for the entire system such as when products of a different kind are to be handled, the system according to the third embodiment of the invention does not require the user to indicate the new kind of product on each memory means of the individual apparatus 1–9. In such a situation, the user has only to pick out the new kind of products from the master file 33 through the master input means 34 or 35. In other words, a single operation can accomplish the purpose and hence the operability of the system is even more improved.

Since the master input means 34 and 35, the master file 33, the master display means 36 and the master control means 37 are provided according to this embodiment such that data can be retrieved from the master file 33 by an operation at any of the input means 13, 14, 18, 19, . . . of the individual apparatus 1–9 through their control means 10, 15, . . . or the master control means 37, the total number of memory devices for the system can be smaller than if memory devices are provided individually to the apparatus 1–9. According to the third embodiment, furthermore, the stored data can be changed more easily because the user has only to update the master file 33.

Moreover, since the master input means 34 and 35, the master file 33, the master display means 36 and the master control means 37 can be positioned separately and away from the group of apparatus 1–9, they may be set, for example, where the management post is located. This makes the control of the total system still easier.

According to the third embodiment of the invention, furthermore, a high-capacity display device capable of displaying a large amount of data may be used only for the master display means 36, while relatively inexpensive smaller-capacity display devices may be used as the individual display devices associated with the individual apparatus required to display only limited amounts of data related to the operations of the associated apparatus. Thus, the total expense for the display system inclusive of the master display means 36 and the individual display means 12, 17, . . . can be reduced. It goes without saying, however, that the invention does not teach away from the use of high-capacity display means for the individual apparatus 1–9.

If the conditions of actual operation are stored in the master file 33, such a database on the history of operation can be relied upon for understanding the number of shipments, the occurrence rate of defective products, the identities of malfunctioning apparatus, etc. for the purpose of control of the entire system. In what follows, means for carrying out such control will be described.

As shown in FIG. 10, which represents a portion of FIG. 9, there is a supply weight detector 41 disposed on the upstream side (with respect to the flow direction of the articles to be weighed, packaged, etc.) of an apparatus unit composed of specified ones of the apparatus group 1–9 such as the supplier 3, the weighing machine 1, the packaging machine 2, the metal detector 4 and the single item weight checker 5. Detection signals w1 outputted from this supply weight detector are adapted to be inputted to the control means 40 of the supplier 3. The master control means 37 includes a cumulative supply quantity calculating means 42 for receiving these detection signals w1 through the aforementioned control means 40 and cumulatively summing them for a fixed period of time to thereby calculate the total weight of the articles supplied during the same period of time. The aforementioned supply weight detector 41 and cumulative supply quantity calculating means 42 constitute what will be hereinafter referred to as a supply quantity detector means 43.

Detection signals w2 indicative of weights and numbers of acceptable articles are outputted from the single item weight checker 5. These detection signals w2 are received through the control means 44 of the single item weight checker 5 by a first cumulative discharge quantity calculating means 45, which cumulatively sums these detection signals w2 for the same fixed period of time to thereby calculate the cumulative sum of the quantity of acceptable articles discharged from the single item weight checker 5 during this period of time. The first cumulative discharge quantity calculating means 45 is adapted to also calculate the net weights of the acceptable articles (with the weight of the bag subtracted) and the number of such acceptable articles. The aforementioned single item weight checker 5 and first cumulative discharge quantity calculating means 45 constitute what is hereinafter referred to as a first discharge quantity detecting means 46.

The master control 37 also includes a first input-output difference calculating means 47 which is adapted to receive signals from the aforementioned cumulative supply quantity calculating means 42 and first cumulative discharge quantity calculating means 45 to calculate the difference between the cumulative supplied quantity and discharged quantity, thereby obtaining the yield of products from the apparatus unit composed of the apparatus 1–5. This yield represents the number of acceptable packaged products with respect to the total packaged products produced from the total weight of the articles that have been supplied. In other words, this represents the yield of the weighing machine 1.

Consider an example where 100 kg of material was supplied and it is desired to produce packages with the target weight of 100 g. Theoretically, the target number of packaged products is 1000 in this case. Since the actual weight of articles weighed by the weighing machine 1 is usually in excess of the target weight of 100 g, the number of packages actually produced may be 980. If ten of these packaged products are found by the weight checker 5 to be of unallowable weight and removed from the shipping line as being unacceptable, the yield of the weighing machine 1 is (980−10)/1000=0.97, or 97%.

The master file 33 is provided with a first input-output quantity memory means 48 for storing the cumulative supply and discharge quantities thus calculated and their difference. Detection signals w3, indicative of the weight and number of acceptable articles outputted from the case weight checker 8, are adapted to be received through a control means 49 of the case weight checker 8 by a second cumulative discharge quantity calculating means 50 for cumulatively summing them over a fixed period of time to thereby calculate the cumulative weight and number of acceptable cases discharged from the case weight checker 8 during this time period. The second cumulative discharge quantity calculating means 50 is adapted to calculate not only the net weight of the products (with the weights of the packaging bags and cases subtracted) but also the number of the cases. The aforementioned case weight checker 8 and second cumulative discharge quantity calculating means 50 constitute what is hereinafter referred to as a second discharge quantity detecting means 51 for obtaining the cumulative discharged quantity during the aforementioned fixed period of time from the apparatus unit including all of the apparatus group 1–9.

The master control means 37 further includes a second input-output difference calculating means 52 for receiving signals from the aforementioned cumulative supply quantity calculating means 42 and the second cumulative discharge quantity calculating means 50 to calculate the difference between the cumulative supplied quantity and the discharged quantity, thereby obtaining the yield of products from the apparatus unit composed of the apparatus 1–8. This yield represents the number of acceptable produced cases with respect to the total weight of the supplied articles. The master file 33 is provided with a second input-output quantity memory means 52 for storing the cumulative supply quantity thus calculated, the cumulative discharged quantity discharged from the case weight checker 8 and the difference therebetween.

With this structure, since the difference between the cumulative supply quantity supplied to the apparatus unit 1–5 and the cumulative discharge amount therefrom can be calculated by the first input-output difference calculating means 47, the yield of the apparatus unit 1–5 and hence that of the weighing machine 1 can be obtained. Since data on the yield are stored in the first input-output quantity memory means 48, the history of yield can be made available to the user.

Similarly, since the difference between the cumulative supply quantity supplied to the apparatus unit including all of the apparatus group 1–9 and the cumulative discharge amount therefrom can be calculated by the second input-output difference calculating means 52, the yield of the entire apparatus group 1–9 can be obtained. Since data on the yield are stored in the second input-output quantity memory means 53, the history of yield can also be made available to the user.

If it is desired to obtain the yield of another apparatus, such as the packaging machine 2, detection signals w4 showing the number of packages from the packaging machine 2 and detection signals w5 indicative of the total number of products checked by the weight checker 5 inclusive of both acceptable and non-acceptable products are accumulated for a fixed period of time and their difference is calculated. Since unacceptably packaged products are visually spotted and removed from the shipping line before reaching the weight checker 5, the difference between the number of the packaged products (w4) and the total number of checked products (w5) represents the yield of the packaging machine 2.

Thus, since it is possible to obtain the yield of any one or more of the apparatus, the system can be more effectively managed, for example, for the maintenance, inspection, necessity for replacement or repair of the apparatus, as well as the estimate for their effective lifetimes.

In the above, the cumulative supply quantity calculating means 42 and the first and second cumulative discharge quantity calculating means 45 and 50 may be provided separately from the master control means 37 and unistructurally formed with the supply weight detector 41 and the weight checker 5 or 8, respectively. A yield can be calculated not only with respect to a number on the input side but also by comparing one weight with another weight or one number with another number.

On the upstream side of the weight checker 5, there is a processing speed detector 55 for detecting the speed at which products are processed, or the line speed. Processing speed signals v outputted from the processing speed detector 55 are received by the control means 44 of the single item weight checker 5. The master control means 37 includes a speed-yield correlation detecting means 56 for receiving the processing speed signals v through the control means 44 to thereby obtain a correlation between the processing speed and the yield at this processing speed calculated by the aforementioned first input-output difference calculating means 47 and the second input-output difference calculating means 52. Correspondingly, the master memory means 33 is provided with a speed-yield correlation memory means 57 for storing the processing speed and the corresponding yield.

With the system thus structured, the correlation between the processing speed v at which products are processed (or the line speed) and the yield is obtainable by the speed-yield correlation detecting means 56 and this correlation is stored as historical data by the speed-yield correlation memory means 57. This enables the user to set the processing speed optimally so as to improve the yield. In order to determine an optimal processing speed, however, the user must take into account not only the yield but also the defect ratios of the apparatus, as will be explained below.

In the above, an apparatus unit consisting of apparatus 1–5 and an apparatus group consisting of apparatus 1–9 were considered. In addition, different apparatus units consisting of only one apparatus or a plurality of apparatus may be considered to obtain correlations between the processing speed v and the yield in a similar way.

In addition to the above, timing means may be provided to specified ones of the apparatus 1–9. In the illustrated example, the specified apparatus are the weighing machine 1 and the packaging machine 2. Thus, the control means 10 and 15 of the weighing machine 1 and the packaging machine 2 are individually provided with timing means 61 and 62 for measuring their operating times t1 and t2, respectively. The master control means 37 is provided with an operation timer 63 for measuring the operating time of the entire apparatus group 1–9, operating time ratio calculating means 64 for calculating the ratios of operating times of the corresponding machines 1 and 2 from a fixed period of time measured by the operation timer 63 and the aforementioned operating times t1 and t2, and a speed-operating time ratio correlation detecting means 65 for correlating the processing speed v with the calculated operating time ratio at the time. The master memory means 33 is similarly provided with a speed-operating time ratio correlation memory means 66 for correspondingly storing the aforementioned processing speed v, operating times t1 and t2 and the operating time ratio.

With the system thus structured, not only can the user obtain the correlation between the processing speed v and the operation speed ratio by means of the speed-operating time ratio correlation detecting means 65 but the correlation thus obtained is stored as historical date in the speed-operating time ratio correlation memory means 66. Thus, a suitable speed of processing can be selected on the basis of this correlation so as to increase the operating time ratio.

By studying the stored operating times t1 and t2 of the weighing machine 1 and the packaging machine 2, for example, the user can determine whether the weighing machine 1 has stopped because of a reason of its own or because there was a trouble in the packaging machine 2, causing the weighing machine 1 also to stop. In other words, the system can provide the user with important information for the system control. In the situation described above, the real operating time ratio of the weighing machine 1 can be obtained by adding to its apparent operating time t1 the time during which it was stopped due to a trouble in the packaging machine 2.

The timing means 61 and 62 may be adapted to measure the non-operating times of the corresponding machines 1 and 2 instead of their operating times. The correlation between the processing speed v and the operating time ratio can be similarly obtained for other apparatus besides the weighing machine 1 and the packaging machine 2.

The master control means 37 is also provided with a failure ratio calculating means 70 for calculating what is hereinafter referred to as the failure ratio of a specified apparatus of the group 1–9 (the packaging machine 2 in the illustrated example). The weighing machine 1, which is disposed on the upstream side of the packaging machine 2, is adapted to output detection signals w6 representing the quantity of discharged products in terms of the number of bags which can be filled therewith (upstream processed quantity). The failure ratio calculating means 70 is adapted to receive not only these detection signals w6 but also detection signals w2 from the single unit weight checker 5 disposed on the downstream side of the packaging machine 2, representing the number of products found to be acceptable by the weight checker 5. The difference between these detection signals w6 and w2 is calculated by the failure ratio calculating means 70 as the failure rate for the packaging machine 2. In other words, the weighing machine 1 serves as upstream processed quantity detecting means for detecting the number of processed units of product on the upstream side, and the single unit weight checker 5 serves as downstream processed quantity detecting means for detecting the number of processed units of product on the downstream side. The master memory means 33 is provided with a failure rate memory means 71 for correspondingly storing the upstream processed quantity w6, the downstream processed quantity w2 and the difference therebetween.

When articles for one unit of product (or for one bag) have been weighed by the weighing machine 1 and are being discharged to the packaging machine 2 in a system as described above, if the discharge speed is excessively large, the articles are provided to the packaging machine 2 incessantly and it becomes difficult to separate the articles for different bags. In such a situation, fluctuations may become large among the contents of the bags, and the ratio of products found to be unacceptable by the single unit weight checker 5 is likely to increase. This ratio is calculated by the failure rate calculating means 70 and obtained as the failure rate of the packaging machine 2. Since this rate is recorded in the failure rate memory means 71 as history of failure rate, the user can thereby diagnose the operating condition of the apparatus and carry out a suitable system management process including maintenance and inspection of the apparatus, judgment on the necessity of repairs thereon and estimates of their active lifetimes.

Failure rates of machines other than the packaging machine 2 can be calculated similarly. Depending on the apparatus, the failure rate may be more conveniently calculated in terms of weights rather than numbers.

The master control means 37 is further provided with a stop timing setting means 75 adapted to transmit to the control means 10, 15, 44, 49, . . . of the individual apparatus 1–9 the numbers of products to be processed by them according to the number of final products to be shipped and to stop the operations of the apparatus 1–9 through their control means 10, 15, 44, 49, . . . when these numbers have been reached. When the number of boxed products, which are discharged from the case weight checker 8 as being acceptable, reaches a preselected target number, the products on the upstream side of the case weight checker 8 become unnecessary. Conventionally, the user relied on his/her "feeling" to stop the operations of the apparatus 1–7 on the upstream side of the case weight checker 8 before stopping the case weight checker 8 itself. Since the system cannot be stopped accurately by an operation in such a manner, there used to be wastes of products. With a system as described above, by contrast, the apparatus 1–7 on the upstream side have already processed the numbers of products specified therefor by the time the case weight checker 8 discharges the required number of products to be shipped. Thus, the waste of products can be eliminated. In situations where the kind of products to be processed is frequently changed, systems capable of stopping the operations with accurate timings have the additional advantage because the kind of products can be changed smoothly.

Although it is a single shipping line that is connected by the communication means 24 according to the third embodiment of the invention illustrated in FIGS. 9 and 10, a fourth embodiment of the invention illustrated in FIG. 11 is characterized in that the communication means 24 serves to connect a plurality of shipping lines 80 together, as well as between the apparatus group 1–9 of each shipping line 80. The master file (the master memory means) 33, the master input means 34 and 35, the master display means 36 and the master control means 37 are disposed separately from the plurality of shipping lines 80 such that these shipping lines 80 can be controlled and managed from one place. In addition to improving the operability of a system with a plurality of shipping lines 80, the fourth embodiment of the invention has the effect of bringing about the same advantages as the third embodiment of the invention described above.

In each of the examples described above, the apparatus group is not limited to the kinds of apparatus 1–9 shown in FIG. 1. The apparatus group may include other kinds of apparatus, for example, apparatus for manufacturing products and adding flavor to food items. If transporting apparatus are provided between apparatus of the group, such transportation apparatus may be included within the group of apparatus. It also goes without saying that the present invention can be applied to a system not including some of the apparatus included in the illustrated examples such as the storage house 9. As for the communication means 24, use may be made of a token ring, token passing or packet communication means.

In summary, the present invention is applicable to various kinds of apparatus integrating system for automatically weighing, packaging and shipping products, inclusive of food products such as candies, vegetables and sea foods and industrial parts such as screws and springs.

What is claimed is:

1. An apparatus integrating system comprising a group of apparatus including a weighing machine for weighing articles to be supplied and a packaging machine for packaging weighed articles, said group of apparatus operating in a mutually coordinated manner; said system comprising:

a master input means for allowing a user to enter and thereby setting conditions of system operation related to operations of all of said group of apparatus;

individual input means each separately associated with one of said group of apparatus for allowing a user to enter and thereby setting conditions of individual operation of said one apparatus and those of said apparatus operating in a mutually coordinated manner therewith;

a master memory means for storing said conditions of system operation and said conditions of individual operations;

a master display means for displaying said conditions of system operation and modes of operations of all of said group of apparatus;

individual display means each provided to one of said group of apparatus for displaying at least said conditions of individual operation and mode of operation of said group of apparatus;

individual control means each provided to one of said group of apparatus for controlling said one apparatus, said individual display means and said master display means according to inputs received through said master input means and said individual input means; and a master control means for controlling said master memory means and said display means according to inputs received through said master input means and signals from said apparatus control means;

said system further comprising communication means for transferring data among said apparatus control means and between said master control means and said apparatus control means.

2. The apparatus integrating system of claim 1 wherein said articles are transported from upstream side to downstream side sequentially through said group of apparatus, and one of said group of apparatus has associated therewith:

upstream processed quantity detecting means for detecting upstream processed quantity defined as the quantity of said articles processed by those of said apparatus on the upstream side of said one apparatus; and downstream processed quantity detecting means for detecting downstream processed quantity defined as the quantity of said articles processed by those of said apparatus on the downstream side of said one apparatus;

said master control means including failure rate calculating means for calculating the difference between said upstream processed quantity and said downstream processed quantity as failure rate of said one apparatus; and said master memory means further including failure rate memory means for storing said upstream processed quantity, said downstream processed quantity and the difference therebetween.

3. The apparatus integrating system of claim 1 wherein said master control means includes stop timing setting means for transmitting to each of said apparatus control means a target number of products to be processed individually by corresponding one of said apparatus and causing said apparatus control means to stop operations of said apparatus when said target number is reached.

4. The apparatus integrating system of claim 1 further comprising:

supply quantity detecting means for detecting cumulative supplied quantity of said articles supplied within a specified period of time to a specified apparatus unit composed to specified one of more of said group of apparatus; and discharge quantity detecting means for obtaining cumulative quantity of said articles discharged within said specified period of time from said specified apparatus unit;

said master control means including an input-output difference calculating means for detecting yield by calculating the difference between said cumulative supply quantity and said cumulative discharge quantity; and said master memory means including an input-output quantity memory means for storing said cumulative supply quantity, said cumulative discharge quantity and the difference therebetween.

5. The apparatus integrating system of claim 4 further comprising a processing speed detector for detecting processing speed at which said articles are processed; said master control means further including speed-yield correlation detecting means for correlating said processing speed with said yield at a same time; and said master memory means further including speed-yield correlation memory means for storing said processing speed and said yield at said same time correspondingly to each other.

6. The apparatus integrating system of claim 1 further comprising:

a processing speed detector for detecting processing speed at which said articles are processed; and timing means for measuring operating or non-operating time of a specified one of said group of apparatus;

said master control means including:

operating time ratio calculating means for calculating operating time ratio of said specified one apparatus during a specified operation time period of said group of apparatus from said specified operation time period and said measured operating or non-operating time; and speed-operating time ratio correlation detecting means for correlating said processing speed and said operating time ratio at a same time; and said master memory means further including speed-operating time ratio correlation memory means for storing said processing speed, said specified operation time period, said operating or non-operating time and said operating time ratio corresponding to one another.

7. An apparatus integrating system comprising a group of apparatus including a weighing machine for weighing articles to be supplied and a packaging machine for packaging weighed articles, said group of apparatus operating in a mutually coordinated manner;

each one of said apparatus separately comprising:

memory means for storing conditions of operation of said one apparatus;

input means for allowing a user to enter and thereby setting conditions of operation of said group of apparatus;

display means for displaying conditions and actual modes of operations of said group of apparatus; and control means for controlling said one apparatus, said memory means and said display means according to inputs received through said input means;

said system also comprising communication means for transferring data among said control means of said group of apparatus.

8. An apparatus integrating system comprising a group of apparatus including a weighing machine for weighing articles to be supplied and a packaging machine for packaging weighed articles, said group of apparatus operating in a mutually coordinated manner; some of said apparatus having a master memory means for storing conditions of operation of said group of apparatus;

each one of said apparatus separately comprising:

input means for allowing a user to enter and thereby setting conditions of operations of said group of apparatus;

display means for displaying conditions and actual modes of operations of said group of apparatus; and control means for controlling said one apparatus, said master memory means and said display means according to inputs received through said input means;

said system also comprising communication means for transferring data among said control means of said group of apparatus and between said master memory means and said control means of said group of apparatus.

* * * * *